T. HEBB.
Rat-Traps.
No. 136,995. Patented March 18, 1873.
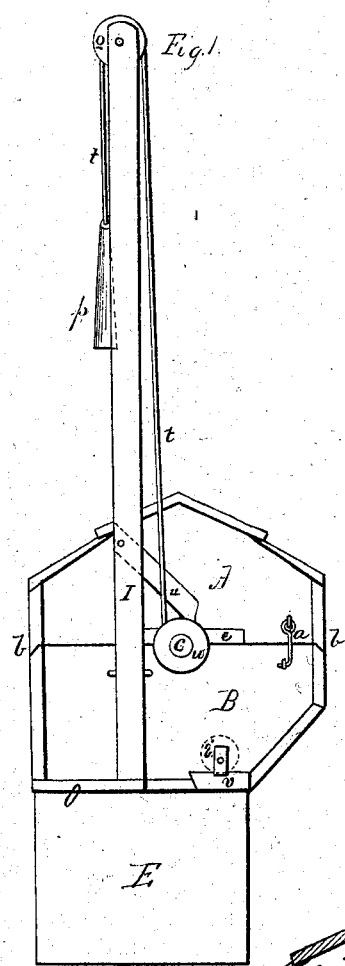
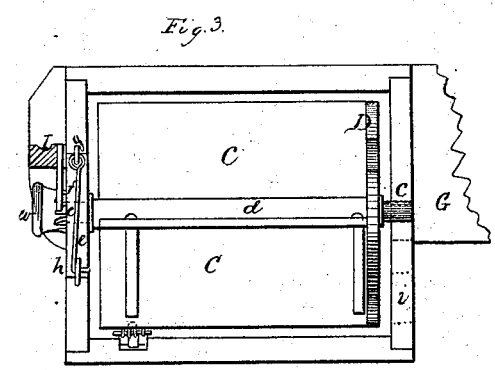
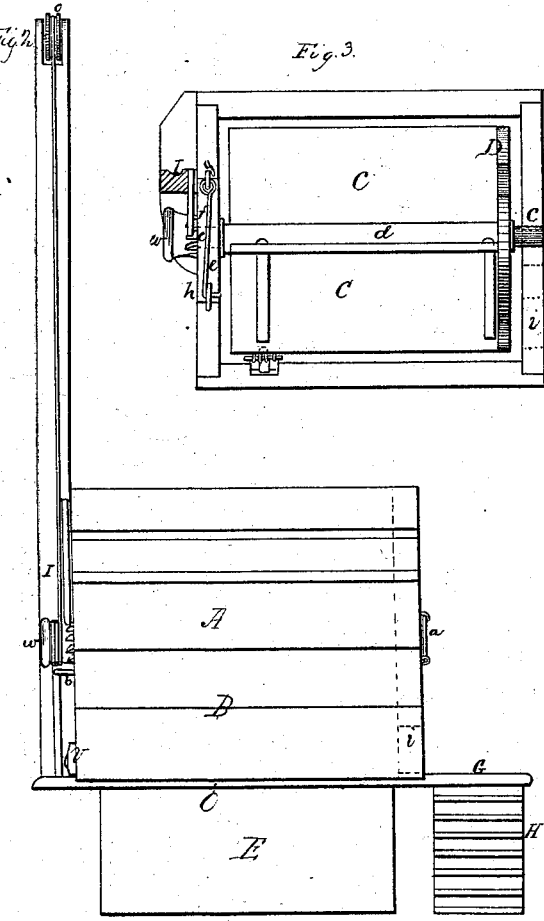
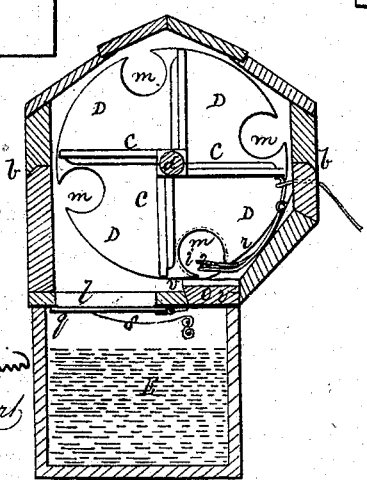
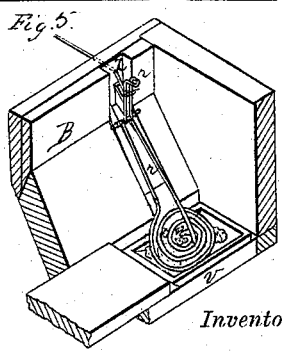
Witness:
A. McCallum
D. G. Stuart
Inventor.
Thomas Hebb
by P. Hannay
Atty.

UNITED STATES PATENT OFFICE.

THOMAS HEBB, OF GREAT MILLS, MARYLAND.

IMPROVEMENT IN RAT-TRAPS.

Specification forming part of Letters Patent No. 136,995, dated March 18, 1873.

*To all whom it may concern:*

Be it known that I, THOMAS HEBB, of Great Mills, in the county of St. Mary's and State of Maryland, have invented certain Improvements in Rat-Traps, of which the following is a specification, reference being had to the accompanying drawing, in which—

Figure 1 represents an end elevation of a rat-trap having my improvement applied thereto; and Fig. 2, a side elevation of the same. Fig. 3 represents a plan of the same with the top removed, the pulley-standard, however, being shown in section and the entrance-platform broken off. Fig. 4 represents a vertical section taken through the line $x\ x$ of Fig. 2; and Fig. 5, a sectional perspective view of a portion of the lower half of the box to illustrate the arrangement of the trigger and food-trough.

My improvement relates to that class of animal-traps in which a fan-bladed wheel is used as a means of capturing the animals; and it consists in a new and improved arrangement of devices to be used in connection with the bait and with the fan-bladed wheel and the devices for operating the same, whereby the capture of the animal tampering with the bait is insured; and it also consists in combining with a box provided with a bait on the inside and with an automatically-rotating wheel, a metal-lined receptacle for the safe keeping of the captured animals, or a reservoir partially filled with water wherein to drown them as fast as caught.

To enable others skilled in the art to make, construct, and use my invention, I will now proceed to describe it in detail, together with its mode of operation.

The box proper is made in two parts, A and B, so that the upper one A may be removed to repair it, if necessary, should the box get out of order. These two parts are clamped together by clasp-hooks $a$, as shown in Fig. 1, and of which there may be one or two at each end, as may be deemed necessary, or at each side, or both; but in practice it is believed one at each end will be found sufficient, when used in connection with counter-beveled edges on the side pieces of the upper and lower halves of the box at their point of junction, as shown at $b$ in Figs. 1 and 4, which will prevent all tendency to lateral motion in the cover A. In the end pieces of each half, and at or near their centers are formed the bearings for the journals $c$ of the wing or fan-bladed wheel C, one half of each bearing being formed in each end of the lower half B of the box, and the other half in each end of the upper part A of the box similar to that represented at $c$ in Fig. 3; or, instead of the upper half being formed directly in the end pieces of the upper part of the box, an upper bearing may be formed in a removable block, $e$, which may be clamped down by a hook, $f$, hinged at one end of the block to a staple, $g$, and taken into an eye, $h$, at the other. By this arrangement the upper part of the box may be removed without loosening the bearings of the wheel, and when the wheel is desired to be removed it can be easily effected by uncatching the hooks $f$ and removing the bearing-blocks $e$. For this purpose one bearing-block, $e$, may be sufficient, in which case it will be arranged at the end of the block next the weight $p$ that operates the wheel C, as shown in Fig. 3. In using the bearing-blocks $e$ and hooks $f$ the lower side of the pieces of the upper part of the box will be formed accordingly, so as to fit over the blocks and hooks, as shown in Fig. 1, a groove of suitable shape being cut to receive the hooks $f$, eyes $h$, and staples $g$. The wheel consists of two or more blades or wings (but four are deemed the preferable number) firmly secured in any suitable manner to a shaft, $d$, and running the full length of the inside of the box, the shaft terminating in journals $c$. On the end of the wings next to the entrance $i$ of the box is secured a disk, D, which is provided with circular openings $m$ immediately at the rear of the wings C, and cutting the periphery of the disk, as shown in Fig. 4. The openings $m$ in the disk admit the animal to the interior of the box, while the solid part cuts off its retreat when the blades of the wheel commence to revolve. The entrance $i$ to the box is at the opposite end to that in which the bait $n$ is placed, as shown in Fig. 3, and is arranged with regard to the bottom and side of the box, as shown at $i$, Figs. 1, 2, and 4. The entrance side of the box is curved or inclined downward toward the blades, so that but little space will be left between the outer edges of the blades and the side of the box for the escape on that side of the animal between them when being forced by the revolution of the blades into the prison-receptacle E. The other side of the box, and which is arranged immediately over the prison-receptacle E, is made perfectly vertical so as to leave no resting-place for the animal as it is forced over or into the mouth of the prison-chamber. The bottom of the box consists of a single board or piece of metal having an opening, $l$, at one side cut in it, which runs the full length of the inside of the box, and is of a width sufficient to allow the animal caught freely to descend through it into the prison-chamber E below.

When a simple prison-chamber, E, is used for securing the captured animals, the opening $l$ of the trap on the under side of the bottom (unless a very deep receptacle is used) will be provided with a hinged trap-door, $q$, a spring, $s$, secured to the end of the box, being arranged on the under side to close it on the passage of each animal; but where a chamber with water for drowning the animals is used, such a trap may be dispensed with. At the entrance end of the box its bottom O is made to project so as to form a platform, G, for the support of the animal as it makes its entrance into the box, an inclined platform or stairway, H, being hinged or otherwise connected thereto to enable the animals to ascend. The bottom O is also made to project slightly at the other end of the box, so as to form a platform for the support of a standard, I, the lower end of which is forked, as shown in Fig. 3. The inner arm of the fork is made to pass through a staple, $s$, secured to the end of the box, while a tongue formed on its lower end takes into a mortise cut in the projecting end of the bottom O, thereby firmly securing it while in use, and rendering it easy to be removed when desired for packing purposes. In the upper end of this standard is mounted a pulley, $o$, over which passes a cord, $t$, one end of which supports a weight, $p$, while the other is secured to a drum, $w$, mounted on and secured to one end of the wheel-shaft $d$, or its journal $c$. By winding the cord $t$ around the drum $w$ a sufficient distance, and then passing the cord and weight of the pulley $o$, as shown in Figs. 1 and 2, the power is prepared which operates the wheel automatically when the trigger is sprung. To prevent backward movement of the wheel, ratchet-teeth are formed on one end of the drum, into which a weighted pawl, $u$, takes, the pawl being pivoted in a slot cut in the standard I. Into this end of the box is placed the bait-trough $v$, and which is fitted into the bottom of the box, (a piece of the latter being removed for the purpose,) the bottom edge of the side of the box and the edge of the bottom itself being beveled so as to form a dovetailed slot for its reception, as shown in Fig. 1, and which holds it in position. As thus fitted the trough is flush or nearly flush with the inner side of the bottom of the box. To the inclined or curved side of the box, and at or near the inner end—that is to say, the end furthest from the entrance $i$, and immediately over the bait-trough, is pivoted a trigger, $r$. This trigger is made of wire, and has its lower end so made as to cover or protect, by projecting over it, the bait placed in the trough. The upper end of this trigger is bent forward so as to form a projection, upon which the inner face of each one of the blades C is made to rest in turn, and when so resting, as shown in Fig. 4, and the cord $t$ and weight $p$ in place, as in Fig. 1, the trap is set for the capture of the animals. The lower end of the trigger is made heavier than the upper one, so that its tendency is to keep the upper end always in position for the arrest of the next descending blade or platform C.

Thus constructed, set, and baited, the animal enters through the opening $i$ and passes along to the bait; in order to reach it, it is obliged to force its head under the lower end of the trigger $r$, which will raise that end, and withdraw, into the recess $z$ cut into the curved side of the box, the upper end from under the blade C. Thus released the wheel is revolved by the weight $p$ acting on the drum $w$ through the cord $t$, the blade forcing the animal in its revolution down through the opening $l$ into the chamber E, where it is either drowned or kept a close prisoner by the automatic closing of the trap-door $q$ through the action of the spring $s$. To this end the weight is made sufficiently heavy to enforce the revolution of the blades and the carrying of the captured animals. Now, as the rat was removed, the withdrawing of its head from under the trigger allowed the lower end of the latter, by virtue of its superior gravity, to descend to its normal position, by that act projecting its upper end so as to arrest the descent of the next blade, thus resetting the trap. This action continues until the weight has descended to the level of the platform, when the cord is to be rewound for the renewal of the operation.

Having thus described my invention, what I claim as new, and desire to secure by Letters Patent, is—

The trigger $r$ and bait-trough, as arranged and combined with a winged wheel, C, the whole operating in the manner and for the purposes set forth.

THOMAS HEBB.

Witnesses:
H. A. FORD,
LOUIS FORD.